(12) United States Patent
Pohl et al.

(10) Patent No.: US 7,291,395 B2
(45) Date of Patent: Nov. 6, 2007

(54) COATED ION EXCHANGED SUBSTRATE AND METHOD OF FORMING

(75) Inventors: Christopher A. Pohl, Union City, CA (US); Charanjit Saini, Milpitas, CA (US)

(73) Assignee: Dionex Corporation, Sunnyvale, CA (US)

( * ) Notice: Subject to any disclaimer, the term of this patent is extended or adjusted under 35 U.S.C. 154(b) by 536 days.

(21) Appl. No.: 10/782,366

(22) Filed: Feb. 18, 2004

(65) Prior Publication Data

US 2005/0181224 A1    Aug. 18, 2005

(51) Int. Cl.
  *B32B 5/16*   (2006.01)
  *B05D 7/00*   (2006.01)
(52) U.S. Cl. .................. 428/407; 427/221; 427/222
(58) Field of Classification Search ............ 428/403, 428/407; 427/212, 221, 222
  See application file for complete search history.

(56) References Cited

U.S. PATENT DOCUMENTS

| 3,041,292 | A | * | 6/1962 | Hatch ......................... 521/28 |
| 4,101,460 | A |   | 7/1978 | Small et al. |
| 4,245,005 | A |   | 1/1981 | Regnier et al. |
| 4,376,047 | A | * | 3/1983 | Pohl ....................... 210/198.2 |
| 4,383,047 | A | * | 5/1983 | Stevens et al. ............... 521/28 |
| 5,324,752 | A | * | 6/1994 | Barretto et al. ............... 521/28 |
| 5,532,279 | A |   | 7/1996 | Barretto et al. |
| 5,865,994 | A |   | 2/1999 | Riviello et al. |
| 6,074,541 | A |   | 6/2000 | Srinivasan et al. |
| 6,867,295 | B2 | * | 3/2005 | Woodruff et al. ........... 536/103 |

OTHER PUBLICATIONS

Alpert, A., et al., "Preparation of a porous microparticulate anion-exchange chromatography support for proteins," *J. Chromatogr.* 185:375-392 (1979).
Kopaciewicz, W., et al., "Stationary phase contributions to retention in high-performance anon-exchange protein chromatography: ligand density and mixed mode effects," *J. Chromatogr.* 318:157-172 (1985).

* cited by examiner

*Primary Examiner*—H. T Le
(74) *Attorney, Agent, or Firm*—David J. Brezner; Morgan, Lewis & Bockius LLP

(57) ABSTRACT

A method for making an ion exchange coating (e.g., a chromatographic medium) on a substrate comprising (a) reacting at least a first amine compound comprising amino groups, with at least a first polyfunctional compound, in the presence of a substrate to form a first condensation polymer reaction product, with a first unreacted excess of either at least said first amino group or polyfunctional compound functional moieties, irreversibly attached to the substrate, and (b) reacting at least a second amine compound or at least a second polyfunctional compound with unreacted excess in the first condensation polymer reaction product to form a second condensation polymer reaction product, and repeating the steps to produce the desired coating. A coated ion exchange substrate so made.

30 Claims, 5 Drawing Sheets

| Column: | Prototype AS19 |
| Eluent: | 35 mM KOH |
| Flow Rate: | 1 mL/min |
| Inj. Volume: | 25 µL |

Peaks:
1. Fluoride 1 ppm
2. Chloride 3
3. Carbonate ?
4. Sulfate 15
5. Nitrite 5
6. Bromide 10
7. Nitrate 10
8. Phosphate 15

COATED ION EXCHANGED SUBSTRATE AND METHOD OF FORMING

BACKGROUND OF THE INVENTION

The present invention relates to a coated ion exchange substrate suitable for use in chromatography medium, and its method of forming.

In one form of liquid chromatography, columns are packed typically with discrete organic polymer granule or particle medium having functionally active surfaces. Preferable shapes for the discrete particle are spheres with regular surfaces. Materials for performing liquid chromatography are known where only thin outer surfaces of the chromatographic support materials are available for active exchange of ions with liquid media. For example, Small, et al. U.S. Pat. No. 4,101,460 describes an ion exchange composition comprising Component A, in insoluble synthetic resin substrate having ion-exchanging sites on its available surface, and Component B, a finely divided insoluble material, irreversibly attached thereto by electrostatic forces. Component B is typically deposited onto Component A from a latex.

A disadvantage regarding the latex coating procedure is that it can take a substantial period of time, e.g., days or even weeks, to make an optimized packed column. Such procedures typically require applying the coating after the column is packed which increases the manufacturing time and labor compared to synthetic methods which can provide a finished product prior to packing. This is because the packing can be made more efficiently in large batches rather than column-by-column. Also, latex synthesis is generally limited to water insoluble monomers which significantly limits choice in terms of available monomers.

Other particulate bed materials with ion exchange layering particles irreversibly bound to the outer surface of support particles are described in Barretto, U.S. Pat. No. 5,532,279. In one embodiment, Barretto describes forming a complex by contacting a suitable dispersant with monomer in an aqueous solution in which the monomer is insoluble. Under suitable conditions for suspension polymerization, the monomer will polymerize to form resin support particles having a dispersant irreversibly attached to those particles. Fine synthetic layering particles are bound to the support particles. A number of other different embodiments are disclosed for irreversible attachment.

Another form of chromatographic medium is made by forming a coating by binding a solution of a preformed polymer with saturated carbon chain backbones including leaving groups under hydrogen abstraction conditions to bind to preformed polymer to a substrate in the presence of a free-radical catalyst which removes leaving groups from the carbon chain to form the covalent bonds. See Srinivasan U.S. Pat. No. 6,074,541. This coating is disclosed for use with a variety of substrates including the inner wall of a conduit or particles for use in a packed bed.

Referring to anion analysis, there is a need for a hydroxide stable anion exchange phase capable of adequately separating bromate from chloride while still achieving good resolution of chlorate from bromate and nitrate. Bromate is of significant interest in water analysis in that it is consider to be a carcinogenic and is a potential byproduct of hypochlorite production often used to disinfect drinking water and ozonation also used to disinfect drinking water.

SUMMARY OF THE INVENTION AND OBJECTS

In accordance with one embodiment of the present invention, a method is provided for making an ion exchange coating on the substrate comprising the steps of (a) reacting at least a first amine compound comprising amino groups selected from the group consisting of ammonia, a primary and a secondary amine, with at least a first polyfunctional compound, having at least two functional moieties reactive with said amino groups, in the presence of a substrate to form a first condensation polymer reaction product, with a first unreacted excess of either at least said first amino group or polyfunctional compound functional moieties, attached to said substrate, and (b) reacting at least a second amine compound, comprising amino groups selected from the group consisting of ammonia, a primary and a secondary amine, or at least a second polyfunctional compound with the unreacted excess in the first condensation polymer reaction product to form a second condensation polymer reaction product.

Another embodiment of the present invention is a coated ion exchange substrate in which the coating comprises at least a first and second condensation polymer reaction product, said first reaction product being attached to said support and comprising a first condensation polymer reaction product of at least a first amine compound, comprising amino groups selected from the group consisting of ammonia, a primary and a secondary amine, and at least a first polyfunctional compound with at least two functional moieties reactive with said amino groups, and said second condensation polymer reaction product comprising the reaction product of either said at least first amine compound or said at least first polyfunctional compound with at least a second amine compound or second polyfunctional compound.

DETAILED DESCRIPTION OF THE PREFERRED EMBODIMENTS

Figure 1:
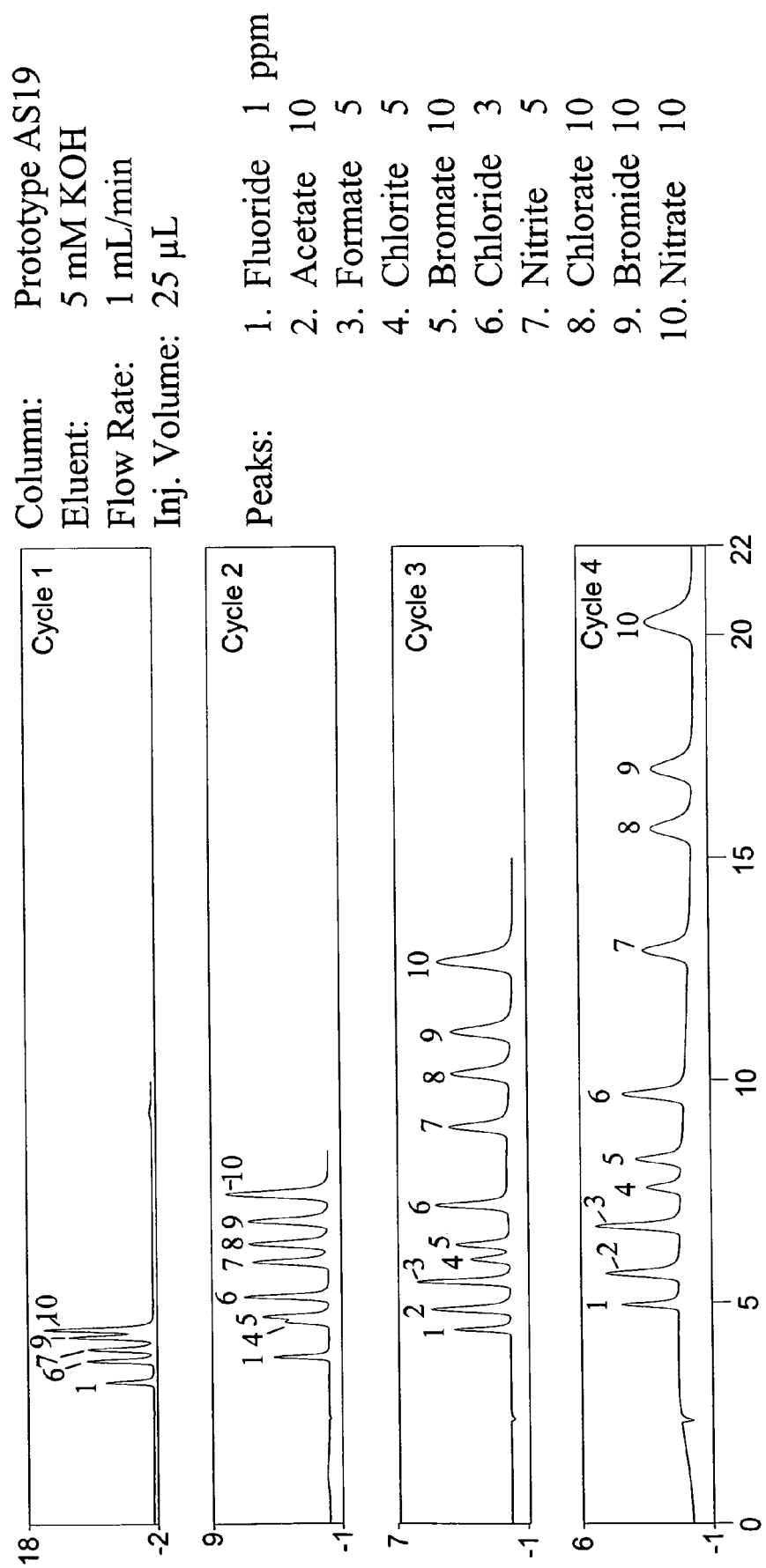
FIGS. 1-5 are chromatograms illustrating use of the coated ion exchange substrates of the present invention as a separation medium.

In accordance with the present invention, an ion exchange coating is formed on a substrate for use in chromatographic applications. The method includes the steps of (a) reacting at least a first amine compound comprising amino groups selected from the group consisting of ammonia, a primary and a secondary amine, with at least a first polyfunctional compound, having at least two functional moieties reactive with said amino groups, in the presence of a substrate to form a first condensation polymer reaction product ("CPRP"), with an excess of either at least said first amine compound or first polyfunctional compound, irreversibly attached to said substrate, the first CPRP including first amine functional moieties, and (b) reacting at least a second amine compound, comprising amino groups selected from the group consisting of ammonia, a primary and a secondary amine, or at least a second polyfunctional compound with the excess first amine compound or first polyfunctional compound in the first condensation polymer reaction product to form a second CPRP as set forth in claim 1. These steps will be referred to herein as step (a) and step (b), respectively.

In step (a), the first amine compound is reacted with a first polyfunctional compound, having at least two functional moieties reacted with said amino groups. The first amine compound and first polyfunctional compound are simultaneously reacted in the presence of a substrate to form the first CPRP irreversibly bound to the substrate. The reaction is performed to provide an excess of unreacted (and therefore reactive) first amine compound or first polyfunctional compound in the first CPRP. By "unreacted" is meant that one or more of the polyfunctional moieties of the amino groups or polyfunctional compounds is unreacted (and therefore reactive). This can be accomplished adjusting the molar ratio of reactants, the concentration of the reactants, the temperature of the reaction or the reaction time. The first CPRP of step (a) will be referred to as a "basement layer" because it attaches to the substrate.

If a molar excess of the polyfunctional compound or amine compound is used to provide the unreacted compound excess in the CPRP, the molar excess may vary over a wide range depending upon the characteristics desired to be imparted to the end product. Thus, for example, the excess expressed in terms of molar ratio of the reactants can be from as low as 0.2:1 to as high as 5:1 or more. Some of the factors used to choose the excess amount will be explained in more detail hereinafter.

The CPRPs are referred to herein as "layers" although each CPRP typically includes spaces or openings. As used herein, the terms CPRP or "condensation polymer reaction product" refer to a product in which the first amine compound reacts with the functional moieties of the polyfunctional compound to form a condensation polymer reaction product. The term "polymer" in this CPRP means a repeating organic chain, formed through the linkage of many identical smaller molecules in which chain growth occurs in a stepwise manner between multifunctional monomers.

The first CPRP is also termed a basement layer. However, it is not necessarily a layer which totally covers or coats the substrate to which it is attached. Each successive condensation polymer reaction product provides additional coverage for the substrate. Preferably, when the last of the series of CPRP is formed, the combination of the CPRPs form coating over the substrate.

The excess of the unreacted first amine compound or first polyfunctional compound enters into the reaction of step (b). There, at least a second amine compound or second polyfunctional compound is reacted with the excess unreacted amine compound or first polyfunctional compound in the first CPRP to form a second CPRP. For example, if the first amine compound is in excess in the first CPRP, then in step (b) a second polyfunctional reaction product is reacted with such excess unreacted first amine compound in step (a) to form a second CPRP. Conversely, if the first polyfunctional compound is in excess in the first CPRP, then in step (b), a second amine compound is reacted with the excess first polyfunctional compound to from the second CPRP.

Referring to the reactants in step (a), the first amine compound comprises an amino group selected from the group consisting of ammonia, a primary amine and a secondary amine. The first amine compound can include additional amine groups and may include both primary and secondary amines as well as tertiary amines.

Suitable amino groups of the primary amine type include methylamine, ethylamine, propylamine, isopropylamine, butylamine, isobutylamine, sec-butylamine, tert-butylamine, amylamine, tert-amylamine, hexylamine, heptylamine, octylamine, benzylamine, phenethylamine, ethanolamine, 3-amino-1-propanol, 1-amino-2-propanol, 2-amino-1-propanol, 2-amino-1,3-propandiol, 4-amino-1-butanol as well as numerous other primary amines either with or without additional polar and/or hydrophilic substituents.

Suitable amino groups of the secondary amine type include dimethylamine, diethylamine, dipropylamine, diisopropylamine, dibutylamine, diisobutylamine, di-sec-butylamine, di-tert-butylamine, di-tert-amylamine, dipentylamine, dihexylamine, diethanolamine, methylethanolamine, ethylethanolamine, morpholine as well as numerous other secondary amines either with or without additional polar and/or hydrophilic substituents.

Suitable amine compounds include aliphatic diamines such as ethylenediamine, 1,3-diaminopropane, 1,2-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane, 1,2-diaminocyclohexane, 1,4-diaminocyclohexane, aromatic benzylic diamines such as m-xylylenediamine, p-xylylenediamine, aliphatic polyamines such as diethylenetriamine, triethylenetetramine and higher polymeric analogues as well as a variety of other structures containing multiple primary, secondary and/or tertiary amine groups in a single compound.

Both the primary and secondary amines are polyfunctional in nature in that they each include at least two functional groups which can react with the polyfunctional groups to form a CPRP as will be described hereinafter. The size of the amine compounds may vary over a wide range from simple non-polymeric compounds, e.g., with molecular weights ranging from 17 to small polymeric compounds with molecular weights of 200 to 10,000. Preferably, each amino group in the amine compounds should have at least three atoms in the link between each amino group in order to achieve good reactivity for each amino group but polymeric species such as polyethyleneimine and polyamines derived from the hydrolysis of n-vinylformamide polymers are also useful in the present invention.

In general, the polyfunctional compounds are defined and include at least two functional moieties reactive with the amino groups in the first or subsequent amine compound forming the first, second or higher numbered CPRP layers. Suitable functional moieties in the polyfunctional compounds include one or more of epoxides, alkyl halides, benzylhalides, tosylates, methylsulfides and mixtures thereof.

Suitable epoxides include butadiene diepoxide, ethyleneglycol diglycidyl ether, butanediol diglycidyl ether, diethyleneglycol diglycidyl ether, hexanediol diglycidyl ether, glycerol triglycidyl ether and numerous other compounds containing two or more epoxy groups including epoxy resins commonly used in commercial epoxy formulations. Suitable alkyl halides include dichloroethane, dichloropropane, dichlorobutane, dibromoethane, dibromopropane dibromobutane as well as numerous other alkyl halides. Suitable benzylhalides include alpha, alpha-dichloroxylene and alpha, alpha-dibromoxylene as well as numerous other benzylic halides. Suitable tosylates include ethyleneglycolditosylate, diethyleneglycolditosylate as well as tosylates of various other aliphatic or aromatic polyols. Suitable methylsulfides include 1,3-bis(methylthio)propane and 1,4-bis(methylthio)butane as well as numerous other polymethylsulfides. The polyfunctional compounds for the present invention preferably include epoxide polyfunctional moieties defined to include monoepoxide compounds, diepoxide compounds and/or polyepoxide moieties in compounds including polymers.

The size of the polyfunctional compounds may vary over a wide range from simple non-polymeric compounds, e.g., with molecular weights less than 87 to small polymeric compounds with molecular weights of 234 to 10,000. Preferably the polyfunctional compounds are water soluble and consist of glycidyl ethers of polyols or contain glycidyl ethers attached to hydrophilic polymers such as polyethyleneglycol or polypropyleneglycol or are combinations of all three such as glycerol propoxylate triglycidyl ether.

Other polyfunctional reagents capable of forming condensation polymers with either polyfunctional amines or polyfunctional epoxide may also be used in conjunction with or in the place of materials suitable for reacting with amines or materials suitable for reacting with epoxides. Suitable alternative polyfunctional reagents for reacting with polyfunctional amines include 2-methyl-2-nitro-1,3-propanediol, dithiobis(succinimidyl propionate), cyanuric chloride, and polyfunctional acid chlorides such as dimethyl adipimidate dihydrochloride. Suitable alternative polyfunctional reagents for reacting with polyfunctional epoxides include compounds such as polyfunctional thiols. Preferably suitable reagents are also water-soluble in order to facilitate water-based synthesis methods.

The compounds used in step (a) may include the first amine compound as the only amine compound and the first polyfunctional compound as the only polyfunctional compound. Alternatively, it can include mixtures of the first amine compound with one or more additional amine compounds. Further, it can include the first polyfunctional compound alone with the first or additional amine compounds or may include a mixture of the first polyfunctional compound and one or more additional polyfunctional compounds. In this way, each condensation polymer reaction product may be tailored to include the desired functions.

Further, the amino groups in each amine compound and the two functional moieties in the polyfunctional compounds may be the same or different from each other. For example, the first amine compound may include at least only a primary amine group, only a secondary amine group, one or more primary and/or secondary groups, or the like. Similarly, the first polyfunctional compound may include the at least two functional moieties reactive with the amino groups which are of the same type or a different type, and may include, in addition, more than two functional moieties.

Referring to step (b), the at least second amine compound or second polyfunctional compound may be characterized in an analogous manner to the first amine compound and first polyfunctional compound. Thus, the second amine compound may be in a mixture with one or more additional amine compounds and may comprise one or more primary and/or secondary amine groups in the second amine compound. For example, assuming the reaction of step (b) uses a second polyfunctional compound, it too can be used in a mixture with other polyfunctional compounds and may include two or more functional moieties reactive with the amine groups. The terms "second amine compound" and "second polyfunctional compound" in step (b) are used to show that step (b) occurs after step (a). However, the meaning of the term "second amine compound" encompasses an amine compound which is the same as or different from the first amine compound. Similarly, the term "second polyfunctional compound" encompasses a second polyfunctional compound which is the same as or different from the first polyfunctional compound.

Successive CPRPs are formed after step (b) by repeating that step, alternating the excess of amine compound or polyfunctional compound so that in each successive layer the opposite of these two compounds is reacted with the excess in the prior layer to form an additional CPRP. For example, after step (b), a step (c) may be performed in which at least a third amine compound or third polyfunctional compound is reacted with the excess of the other compound in the second CPRP. Thus, the third amine compound or third polyfunctional compound is reacted with the excess one of the second amine compound or second polyfunctional compound in the second CPRP to form a third CPRP. As discussed above, this process can be repeated as many times as desired to accomplish desired properties to the end product, typically in the form of a complete coating on the substrate.

In one embodiment, the substrate has a surface comprising an organic polymer. The term "surface" encompasses both the surface of a substrate which is of the same chemical makeup as the remainder of the substrate, and a surface with a surface layer on a support substrate of a different chemical makeup. Thus, the organic polymer surface may comprise the entire substrate or just the top surface of the substrate which may be formed of another material such as one made of an inorganic oxide. Alternatively, the substrate may comprise in inorganic material on its surface, such as one made of an inorganic oxide, e.g., silica gel, alumina, titania, zirconia, and fused silica.

Suitable substrates can include a variety of commercially available chromatographic media such as packed beds of chromatography particles, and also include many other formats including tubing which has been suitably derivatized and fused silica capillaries which can be used after a simple base hydrolysis treatment to activate the surface. Thus, the term "substrate" encompasses one or more substrates unless otherwise specified. Furthermore, products based on planar materials such as "chips" and arrays commonly employed in biological assays may also be employed as substrates. In the latter case, the surfaces may be modified by application of multiple layers as described above or one or more layers of gel forming reagent mixtures may be applied to the surface to form binding sites for biological molecules.

In a preferred embodiment of the invention, the substrate includes anion functional moieties on its surface. In this manner, the irreversible attachment is by electrostatic bonding between the amino groups on the first CPRP and the anion functional moieties on the substrate surface. Such anion functional moieties could comprise any cation exchange material including ones described in Small, et al. U.S. Pat. No. 4,101,460 in which is described finely divided insoluble materials are bound by electrostatic attraction to substrate particles having ion exchange sites.

In addition, while attachment through electrostatic attraction to anionic surfaces is a preferred embodiment of the invention, attachment can also be accomplished through the use of chemically modified substrates. For example, a conventional radical graft of a polymer substrate containing suitable graft sites on the surface can be accomplished using monomers containing primary, secondary or tertiary amine functionality. In this case, the condensation polymer will be directly covalently linked to the substrate surface. In addition, the surface of the substrate can be derivatized so as to introduce amino functionality. Subsequent exposure to the previously mentioned condensation polymer reagents will again produce a covalently linked condensation polymer surface graft.

Using the above method, a coated ion exchange substrate is formed in which the coating comprises at least a first and second CPRP. The first CPRP is irreversibly bound to the surface of the support substrate and comprises at least first amine compound of the foregoing type and at least a first polyfunctional compound with at least two functional moieties reactive with the amino groups of the first amine compound. A second CPRP is formed comprising the reaction product of the first amine compound or first polyfunctional compound with a second amine compound or second amine functional compound. This product encompasses at least the first and second CPRPs, in addition, a third or any subsequent CPRPs formed in sequential reaction with the second CPRP as described above.

As set forth above, the reaction step (c) may be repeated any desired number of times. At any time in the above process, the outside layer of condensation polymer reaction products have the cation functionality of the amine groups. In one preferred embodiment, the product of this reaction may be used directly in this form without further modification. In this case, the product of this reaction will contain both strong base anion exchange sites and weak base anion exchange sites which can be advantageous for some separations. In another preferred embodiment, strong base anion exchange sites may be introduced into the outside layer of the condensation polymer through a capping reaction by reacting with: a capping compound comprising a tertiary amine group. In this manner, the reaction is capped or terminated and the ion exchange coating includes a greatly increased number of quaternary amines conventionally used for the separation of anions, as when the substrate is used in the form of anion exchange packing for a chromatography column or the like.

In another embodiment, the coated ion exchange substrate may be converted to a cation exchange substrate by reacting excess amine reactive functional groups on the exterior surface of the coated substrate with amine containing cation functional compounds to convert the substrate to a cation exchange substrate. As set forth above, in one preferred embodiment, the substrate comprises a plurality of substrates in the form of particles and the coated particles comprise ion exchange packing particles such as for chromatographic separations. Suitable amine containing cation functional groups include sulfonic acid, phosphonic acid and carboxylic acid or combinations thereof. Preferably, suitable amine containing cation functional compounds include two or more cation functional groups such that the total number of cation functional groups exceeds the number of previously formed anion exchange sites. Suitable compounds include: γ-Carboxyglutamic acid, Nitrilotriacetic acid, 3,3', 3"-Nitrilotripropionic Acid, N-(2-Carboxyethyl)iminodiacetic acid, N-(Phosphonomethyl)glycine, 2-Amino-3-phosphonopropionic acid, Iminodi(methylphosphonic acid), 2-Aminoethylphosphonic acid, piperazine-1,4-bis(2-ethanesulfonic acid), Homocysteic acid and 2-Amino-3-sulfopropionic acid, as well as numerous other amine containing cation functional compounds.

In another embodiment, the coated ion exchange substrate may be converted to a cation exchange substrate by reacting excess amine functional groups on the exterior surface of the coated substrate with cation functional compounds to convert the substrate to a cation exchange substrate. As set forth above, in one preferred embodiment, the substrate comprises a plurality of substrates in the form of particles and the coated particles comprise ion exchange packing particles such as for chromatographic separations. Suitable cation functional groups include sulfonic acid, phosphonic acid and carboxylic acid. Suitable cation functional compounds include: chloroacetic acid, bromoacetic acid, chloropropionic acid, bromopropionic acid, sodium 2-chloroethanesulfonate, sodium 2-bromoethanesulfonate or 1,4-Butane sultone. Phosphonic acid cation functional groups can be introduced using suitable reagents such as phosphorouspentachloride or phosphorous oxybromide followed by hydrolysis.

In one embodiment, one or more of the condensation polymer functional groups is branched and/or cross-linked. For example, the second, third or higher CPRPs can be branched and cross-linked by appropriate choice of reagents and by choice of reagents and by adjustment of the ratios of reagents and excesses of one or the other of the amine compounds and polyfunctional compounds as set forth hereinafter.

In a preferred embodiment, the "basement layer" of step (a) is prepared using a mixture of polyfunctional amine and polyfunctional epoxide compounds. The composition of this layer is adjusted so that the mixture will not produce a gel under the conditions of application of the "basement layer." For example, methylamine (a trifunctional amine capable of reacting with a total of three epoxy groups, forming a quaternary ion exchange site) is preferably combined with a water-soluble diepoxide (a difunctional epoxide), in a preferred embodiment butanediol diglycidyl ether. If these two ingredients are combined in the ratio of two moles of methylamine to three moles of butanediol diglycidyl ether, they tend to form a cross-linked gel since they are combined together in a stoichiometry complementing of their functionality. Such a reaction mixture in either the resin slurry mode or a flow-through "packed column" mode may be undesirable in that in the former case gelation would result in resin particles suspended in a stable gel unsuitable for use in liquid chromatography and in the latter case would result in the development of extremely high pressures, precluding the use of pumping as a means of delivering the reagent, rendering the material unsuitable for use in liquid chromatography. If instead, the ratio of the two reagents is adjusted so that a gel does not form (preferably using a composition close to that capable of gelation without using a composition capable of gelation), the solution can be passed through the "packed column" without experiencing a high-pressure characteristic of gelation. Furthermore, the coating thickness will continue to increase as this solution is passed through the column.

In a preferred embodiment, useful "basement layer" coatings can be achieved by using a 1:1 mole ratio of the preferred reagents while allowing the reagents to react in the presence of a sulfonated substrate for one hour at 65° C. Using this composition allows formation of a largely linear CPRP on the surface of the substrate. The condensation polymer formed with this composition contains a significant number of reactive amines sites because under these conditions the amine reactant is in excess in terms of the functionality of the reagent. Thus, when combining methylamine (a trifunctional reagent) and butanediol diglycidyl ether (a difunctional reagent) in a 1:1 ratio, a polymer will be formed with on average two butanediol diglycidyl ether reagents attached to each methylamine reagent forming a largely linear polymer with the resulting polymer being primarily an alternating polymer with amine and butanediol diglycidyl ether groups alternating in the polymer chain. The majority of all amine groups thus formed being tertiary at the completion of the "basement layer" preparation step although some of the amine groups at this point will be quaternary and some of the amine groups will be secondary. These tertiary amine groups (as well as the secondary amine groups) are still available for further reaction, forming quaternary sites at each reaction site. Accordingly, the "basement layer" is accessible for subsequent treatment with polyfunctional epoxides.

In one preferred embodiment, the substrate, already coated with the "basement layer" is subsequently allowed to react with a large excess (e.g., 50 to 200%) of polyfunctional epoxide, preferably butanediol diglycidyl ether in order to attach the reagent to the "basement layer". By utilizing a large excess of polyfunctional epoxide, the "basement layer" is now decorated with pendant unreacted epoxide groups. Following treatment with a large excess (e.g., 50 to 200%) of polyfunctional epoxide, the substrate is now treated with a large excess of polyfunctional amine, preferably methylamine. This leaves the surface decorated with pendant groups containing amine functionality with two residual reactive sites.

Repeating the cycle of using a large excess of polyfunctional epoxide followed by a large excess of polyfunctional amine will result in branch points at every amine with a quaternary site at the branch points. Theoretically, making use of butanediol diglycidyl ether and methylamine and alternating reactions, will result in a doubling of the number branches with each layer. By utilizing this method very high capacities can be achieved by repeating the cycle a suitable number of times (e.g., at least 3, 4, 5, 6, 7, 8 or more times). In practice, the situation is significantly more complex than this because as branching increases the probability of branches becoming cross-linked together also increases.

Accordingly, materials produced using the preferred embodiment will tend to have an increasing amount of cross-link as the number of cycles increases (assuming at least 1 of the reagents utilized has a functionality >2). However, if layers are alternated with both a difunctional amine and a difunctional epoxide, chain propagation will be predominantly linear and cross-linking side reactions will be greatly diminished.

An additional possible complication in this reaction chemistry is the tendency for epoxides to undergo base catalyzed polymerization. Since condensation polymers using this synthesis strategy will be in the hydroxide form, they can under some conditions induce polymerization of the polyfunctional epoxy monomer in the absence of any amine. The final condensation polymer likely contains a fraction of polyepoxide formed via this polymerization side reaction which also decorates the surface. The presence of these additional reaction pathways does not by itself limit the utility of the current method as the examples provided in the attachment coated demonstrate. Useful compositions can be created by varying the different combinations including changing the nature of either the amine or the epoxide or both in each layer or by making use of combinations of either amines or epoxides in each layer.

While the exact conditions may vary in terms of concentration, temperature and time required for a given mixture of polyfunctional epoxy monomer and polyfunctional amine to result in gel formation, there is a simple empirical experimental methodology suitable for determination of conditions optimal for preparation of the "basement layer" in order to prevent gel formation during this step. First, start with a 1:1 mole stoichiometry and produce a solution of the two reagents in the proposed reaction solvent. Allow the reagents to react for the proposed reaction duration at the proposed temperature and note the presence or absence of gel formation. If gel formation is observed, decrease the quantity of epoxy monomer and repeat the process until the boundary between gel forming conditions and non-gel forming conditions is established. Alternatively, if no gel formation is observed, increase the amount of epoxy monomer in the formulation until gel formation is observed. Then select the highest concentration of epoxy monomer which did not result in gel formation. This will provide a good initial formulation for the "basement layer". Further optimization may still be necessary under real graft conditions in order to optimize graft capacity and/or cross-linking. If enough additional epoxy monomer is added, a second region of reagent formulations capable of operating under non-gel forming conditions is also achievable. However, because of the tendency of epoxy monomers to polymerize under alkaline conditions, this concentration regime typically requires extreme ratios of epoxy monomer to amine monomer. Generally, it is preferable to operate where the "basement layer" is rich in residual amine reactive sites as this provides good adhesion to the surface, when utilizing electrostatic binding. When operating where the "basement layer" is prepared with epoxy monomer in stoichiometric excess, it is preferable to start with an amine treatment step prior to the epoxy-amine cycles detailed above.

In a preferred embodiment, epoxy monomer is used to produce hydroxide selective materials. Hydroxide selectivity requires hydroxyl functional groups located near the quaternary center of each anion exchange site. Epoxy monomers provide such hydroxyl groups as a byproduct of the reaction of epoxides with amines. Accordingly, such condensation polymers are particularly useful for making hydroxide selectivity anion exchange phases. However, this does not limit the utility of the invention to epoxy monomers and amines. In fact, analogous condensation polymers can also be produced using for example polyfunctional alkylhalides in conjunction with polyfunctional amines. Such condensation polymers will not be hydroxide selective but will still be useful for preparation of anion exchange phases.

Although, as mentioned above, conditions leading to gel formation are generally to be avoided, especially in the case of slurry grafting, useful synthesis methods include use of combinations which ultimately lead to gel formation by simply reducing exposure time of the resin to the reaction mixture such that the exposure time is less than the gelation time of the reaction mixture. In one useful embodiment of the current invention, passing such a solution through a packed bed of resin not only results in a graft to the resin surface but also in attachment of the individual particles in the packed column to form a particle based monolith. By choosing appropriate conditions, the resulting monolith can be removed from the column body within which it was formed. Because polymers generally always contract as polymerization proceeds, the column contents shrink away from the column wall allowing removal of the monolith from the column hardware. The resulting monolith is generally flexible when well hydrated. By allowing the monolith to dry and reinserting it into suitable dimension column hardware, the resulting monolith can be utilized for chromatographic separations.

Also, according to the invention, a large quantity of particles may be packed in a bed and coated in a large flow-through column and removed in large quantities as a supply for packed smaller analytical columns.

Although a preferred embodiment utilizes methylamine, as set forth above a wide variety of alternative polyfunctional amines are also suitable for the present invention including simple diamines, triamines and higher polyamines. Propagation of polymer growth steps requires that the amine contain at least two available reactions sites. Termination of polymer growth can be accomplished by a final reaction step with tertiary amine containing compounds or the reaction can be ended without such a terminating reaction.

An advantage of the current invention is that when the condensation polymer is applied to a column packed with substrate, the coating process can be interrupted for column evaluation, and then the process can be resumed. However, because epoxides are subject to hydrolysis under alkaline conditions, it is generally preferable to interrupt the reaction after reaction with a polyfunctional amine containing reagent rather than immediately after reaction with a polyfunctional epoxy containing reagent. Likewise, although the preferred polyfunctional epoxide is butanediol diglycidyl ether a wide variety of polyfunctional epoxides may be used in the present invention. Ideally the polyfunctional epoxide should be water-soluble to facilitate formation of the condensation polymer under aqueous conditions but any of the numerous polyfunctional epoxides available can be used for this purpose. Furthermore, a wide variety polyglycidyl reagents not readily available can be readily synthesized using standard synthesis methods.

While in situ column preparation of condensation polymers is a convenient way of quickly evaluating different formulations, in situ column preparation is generally not as efficient as batch synthesis. However, by making use of either slurry grafting techniques or preferably large packed bed reactors, optimal coating chemistries can easily be transferred to larger scale batch processes.

In general terms, epoxides and amines react as set forth in the following equations [equation (1) for a primary amine and equation (2) for a tertiary amine]:

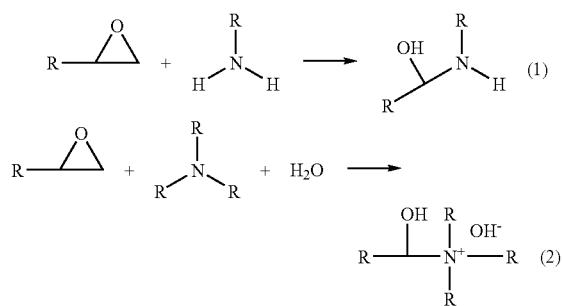

Equation (1) illustrates the reaction of an epoxide with a primary amine. Reactions between epoxides and ammonia, primary amines and secondary amines produce a reaction product which is directly suitable for subsequent reactions since the reaction product is in the freebase form. Other polyfunctional compounds such as alkyl halides produce reaction products which are in the salt form, necessitating a separate step or additional reagents to convert the reaction product back to the freebase form. Equation (2) illustrates the reaction of an epoxide with a tertiary amine. In the case of tertiary amines, the reaction product is a quaternary ammonium ion. Unlike the previous example, this reaction also requires one mole of water. The counterion formed spontaneously as a byproduct of this reaction is hydroxide anion. This byproduct is advantageous in that it helps maintain an alkaline reaction medium which is beneficial for subsequent reaction of adjacent amine groups with additional polyfunctional compounds.

A hypothetical reaction of a polyfunctional compound (a diepoxide) and a polyfunctional amine (a primary amine) in a 3:1 ratio (diepoxide:amine) is illustrated in equation (3):

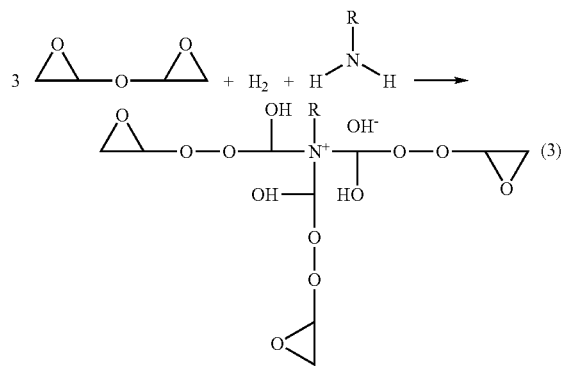

Equation (3) illustrates the hypothetical reaction product observed when the diepoxide is used in large excess relative to the amine concentration. The simplest conceivable reaction product is a trifunctional quaternary ammonium compound. As in the previous example, the quaternary ion exchange site has a hydroxide counterion as a reaction byproduct. In practice, the actual product formed under these conditions is far more complex. In most cases, the product will contain a mixture of quaternary sites and tertiary sites with a significantly higher molecular weight product than indicated in equation (3) and the hydroxide present in the reaction product will also tend to catalyze polymerization of the diepoxide which will result in a much more complex reaction product than illustrated.

A hypothetical reaction of a diepoxide and a primary amine in a 1:1 ratio (diepoxide:amine) is illustrated in the following equation (4):

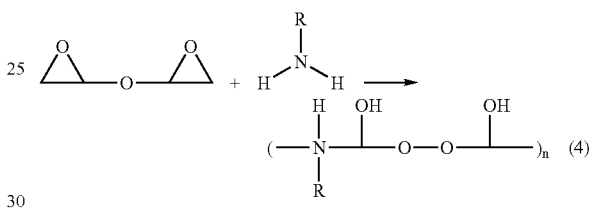

Equation (4) illustrates the reaction product to be expected when a primary amine and a diepoxide are combined in a 1:1 molar ratio. Although a number of side groups and branch points are possible reaction byproducts, the predominant product of such a reaction will be a linear polymer of the type illustrated above where each segment contains a tertiary amine group along with a hydrophilic linker. The degree of polymerization is dependent upon reaction conditions but the number of such repeating units (n) in the polymer thus formed can vary from as low as two or three to as high as several hundred. Ideally, high degrees of polymerization will be achieved in order at to provide good coverage of the entire surface and strong adhesion to the surface.

A hyperbranch polymer schematic using a basement coating in a 1:1 ratio (diepoxide:amine) is shown for a series of sequential reactions in hypothetical schematics (5-9):

Schematic (5) demonstrates the basement coating [1:1 ratio (diepoxide:amine)]

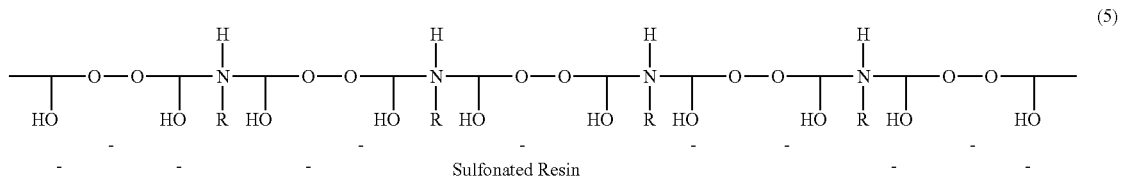

Sulfonated Resin

As illustrated, the first CPRP has an excess of amine and the substrate is a collection of resin particles of suitable size for chromatographic packing, sulfonated on its surface. Schematic (5) illustrates the basic linear structure of the "basement layer". As mentioned previously, most of the amine groups in the layer will be tertiary and are thus available for subsequent reaction steps. The presence of branch points and associated quaternary sites help enhance adhesion of the "ground layer" (not illustrated). Surface anionic charges indicated by (−) on the resin surface result in electrostatic attraction and attachment between the resin surface and the CPRP.

A second CPRP is formed as illustrated in schematic (6). In this instance, the reactant in excess in the first CPRP is the amine compound and so the second condensation reaction product is formed with the polyfunctional compound in the form of a diepoxide compound as illustrated. The second CPRP now contains pendant reactivity epoxide groups decorating the surface. In addition, this step serves to further cross-link the "basement layer" through cross-links between adjacent polymer strands (not illustrated), thus rendering the second CPRP a cross-linked conformal coating, no longer requiring electrostatic adhesion to retain the coating. Because the quaternary sites contain hydroxide counteranions, the epoxide groups pendant to the surface are prone to base hydrolysis which will produce a surface decorated with glycol functional groups. While such a reaction product might be useful for some applications, it would interfere with further reactions. Preferably, an additional treatment with an amine compound is done immediately following formation of the second CPRP in cases where further layers are desirable.

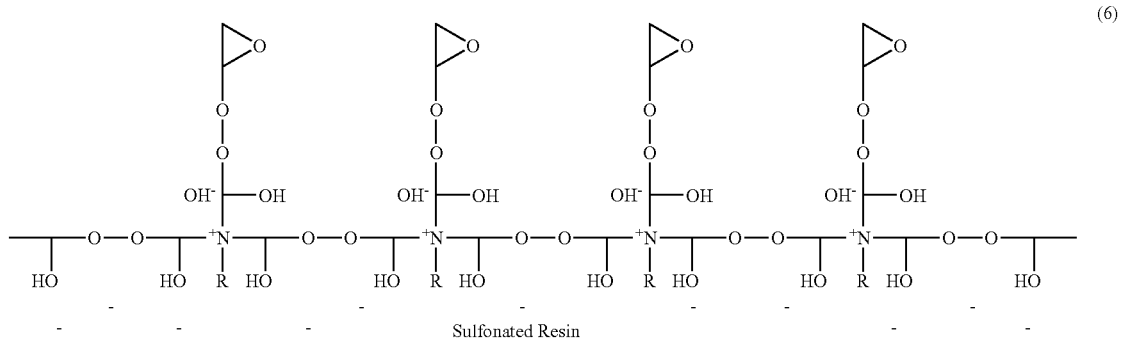
(6)

In schematic (7), a third CPRP is illustrated in which the excess epoxide in the second CPRP is reacted with a primary amine. The third CPRP now contains a surface decorated with secondary amino groups. It is possible that some of the amino groups have reacted with adjacent epoxy groups to form surface cross-links but generally the density of such surface groups is too low to allow for this. As mentioned above, preparation of this third CPRP is preferably accomplished immediately following the completion of the preparation of the second CPRP in order to avoid hydrolysis of pendant epoxide groups. Since each of the secondary amine groups is still a difunctional compound, further reaction with a diepoxide will result in a branch point at each of the pendant amino groups provided the reaction is driven to completion.

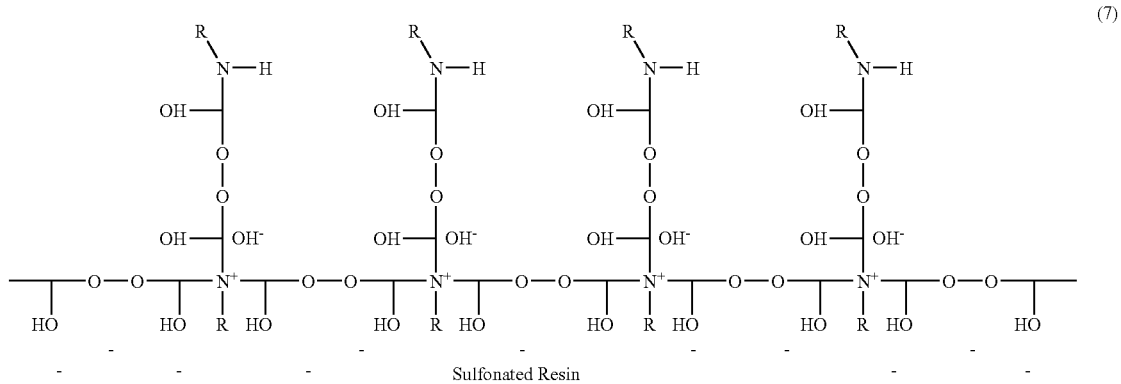
(7)

Referring to schematic (8), a theoretical hyperbranched layer product is illustrated with four CPRPs. Branching can occur at the amine compound. Schematic (8) illustrates branching in the case where the reaction has been driven to completion. As mentioned above, such branching is a byproduct of the residual difunctionality of the secondary amino groups decorating the surface. The branching occurs in the fourth CPRP.

ture can also play a role in determining the magnitude of cross-links. For example, using a relatively low concentration of multifunctional amine compound during the formation of the fifth CPRP increases the probability that a pendant amine group will have the opportunity to react was adjacent epoxy groups. Thus, the level of cross-link can be tailored to meet: the specific separation selectivity requirements by adjusting the concentration of the amine, the

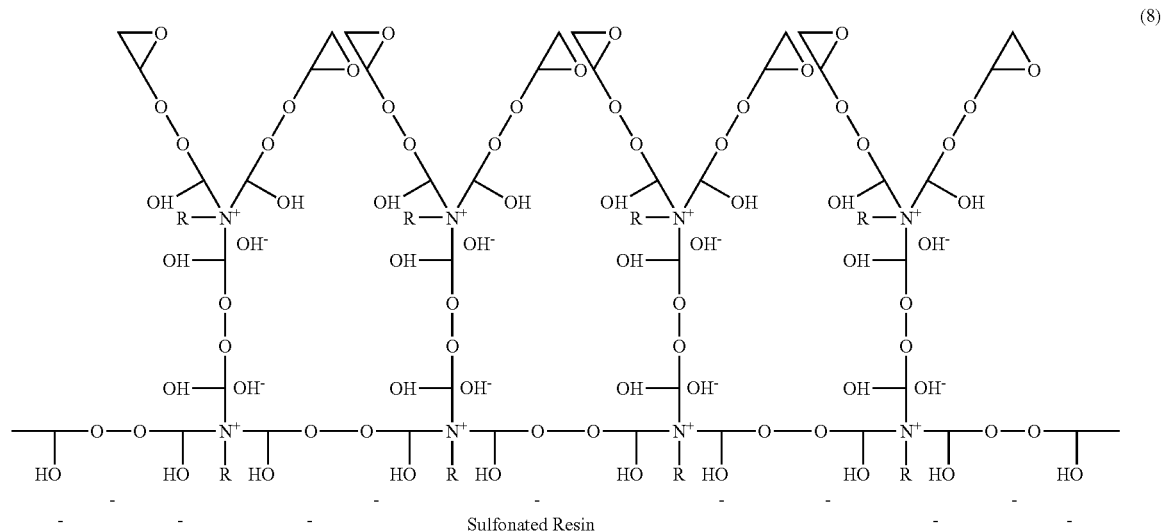

(8)

In the last illustrated schematic (9), a fifth CPRP is illustrated in which the branched condensation reaction product of schematic (8) is cross-linked using amine compounds. As the level of branching increases, the probability of cross-links between adjacent branches also increases. In schematic (9) such a cross-link is illustrated. The number of such groups can be expected to increase by increasing the number of reaction steps but other parameters such as reagent concentration, reaction time and reaction temperature of the reaction and the duration of the reaction. Use of reaction conditions insufficient to drive the reaction to completion is also used as a means of inducing cross-link. For example, if conditions are chosen such that only half of the pendant epoxide groups have reacted with a multifunctional amine compound, after excess multifunctional amine compound has been removed from contact with the CPRP, additional cross-linking reactions can still take place between adjacent pendant amine and epoxide branches.

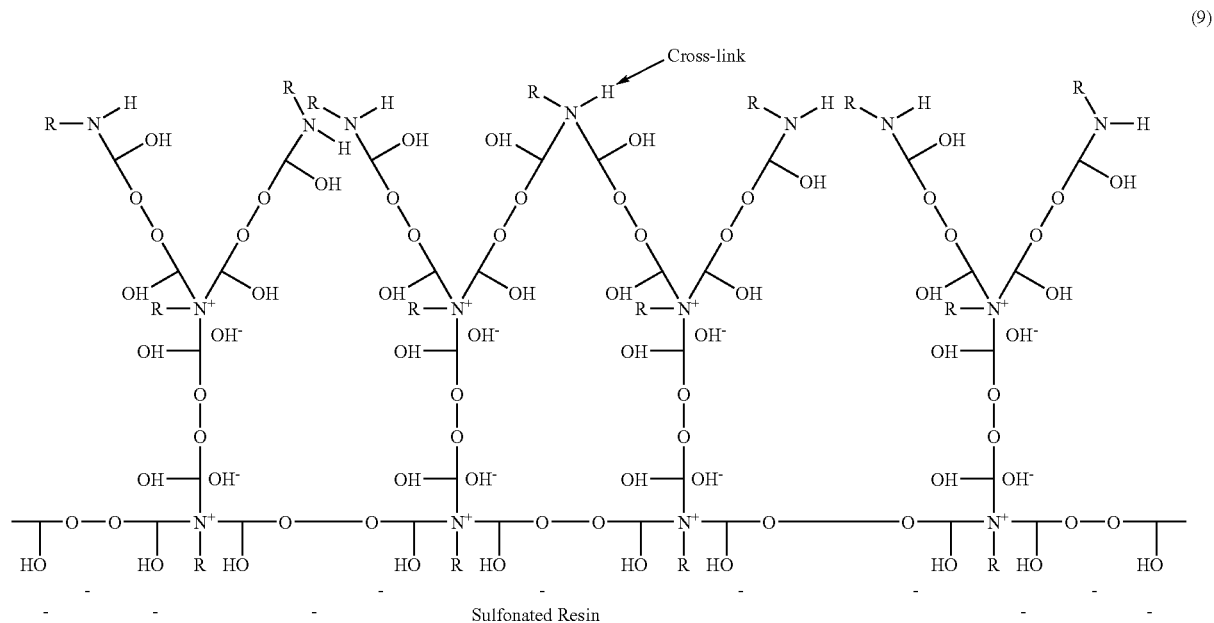

(9)

Features and benefits of the invention include one or more of the following:

1). Hydroxide selective, hydrolytically stable materials can be readily form on a wide variety of surfaces.

2). The hydrophilic nature of the condensation polymers are ideally suited for the separation of disinfectant byproduct anions, providing excellent resolution of bromate from chloride as well as excellent resolution of both bromide and chlorate from nitrate.

3). Condensation polymers can be formed from a wide variety of commercially available reagents to enable the preparation of materials of optimal selectivity for specific separation requirements.

4). Coatings can be applied to resin after the column is packed, facilitating rapid screening of suitable coating chemistries.

5). Coatings can also be applied to resin under slurry conditions or in packed beds in order to provide suitable synthesis scale for large-scale production, minimizing manufacturing cost.

6). The coating process can be interrupted at any stage in the reaction process for testing without interfering with the reaction process. The coating process can then be resumed based on intermediate test data.

7). In the case of the preferred embodiment, as well as closely related analogues produced from aliphatic polyfunctional epoxides and aliphatic polyfunctional amines, the reaction product is UV transparent making it suitable for direct detection of analytes within the stationary phase provided the material is applied to a suitable UV transparent substrate.

8). By using electrostatic attachment of the condensation polymer to a substrate it is now possible to achieve the improved chromatographic performance previously only achievable using latex coated substrates while still affording a benefits of batch synthesis previously only available using graft polymerization. In essence, this new condensation polymer synthesis method combines the best features of the two most commonly used stationary phase synthesis methods.

In order to illustrate the present invention, the following non-limited examples of its practice are given.

EXAMPLE 1

Application of All Layers In-Column

Chromatographic packing was used as the substrate to form a coated polymer according to the present invention. The process is as follows:

The basement layer (first CPRP) is applied in a packed column (4×250 mm packed with 6.1µ surface sulfonated 22 $m^2$/g wide-pore resin) at 0.25 m/min:

Pump 7.2% 1,4-butanediol diglycidyl ether and 1.12% methylamine mixture at 60° C. water bath for 60 minutes Rinse with DI $H_2O$ for 10 minutes Each layer consists of the following reaction "cycle" at 0.25 ml/min:

Pump 10% 1,4-butanediol diglycidyl ether for 10 minutes

Place column for 30 minutes

Rinse with DI $H_2O$ for 5 minutes

Pump 4% methylamine for 10 minutes

Place column in 60° C. water bath for 30 minutes

Rinse with DI $H_2O$ for 5 minutes

EXAMPLE 2

The cycle of Example 1 was repeated one, two, three and four times to form four different selectivities in succession in the same chromatographic column. Chromatographic runs were performed using the DX500 system of Dionex Corporation with a packed chromatographic column as set forth above. The analyte mixture comprised fluoride, acetate, formate, chlorite, bromate, chloride, nitrite, chlorate, bromide and nitrate. The conditions of the runs are illustrated in FIG. 1. The results are illustrated in the chromatograms of FIG. 1 for the four different selectivity resins. FIG. 1 illustrates the utility of the stationary phase for the separation of the above-mentioned ions which include disinfectant byproduct anions. As expected, increasing the number of cycles results in an increasing column capacity. Furthermore, the separation of specific pairs of ions is enhanced by applying additional layers. Note that the resolution of chlorite and bromate are improved by increasing the number of layers. This is a direct consequence of increasing cross-link as the coating thickness increases since the separation of these two ions is highly cross-link dependent.

EXAMPLE 3

Uninterrupted Preparation In-Column

In this example, an uninterrupted preparation in-column coated packing is made using somewhat different conditions as follows.

The basement layer (CPRP) is applied in a packed column (4×250 mm packed with 6.1µ surface sulfonated 22 $m^2$/g wide-pore resin) at 0.25 ml/min and 65° C.:

Pump 7.2% 1,4-butanediol diglycidyl ether and 1.12% methylamine mixture at through the column for 60 minutes Rinse with DI $H_2O$ for 2 minutes This was followed by four layers, each consisting of the following reaction "cycle" at 0.25 ml/min and 65° C.:

Pump 10% 1,4-butanediol diglycidyl ether for 30 minutes

Rinse with DI $H_2O$ for 2 minutes

Pump 4% methylamine for 30 minutes

Rinse with DI $H_2O$ for 2 minutes

This example illustrates the ability to prepare analytically useful coatings in situ. Unlike the case where the "basement layer" is applied prior to packing, the entire coating process was accomplished after the column had been packed without interruption for testing after each reaction cycle. This obviated the need for a number of packing experiments required in order to determine the appropriate packing conditions for resin coated with the "basement layer" prior to packing. In the case of Example 3, the standard conditions used for preparing a latex coated material were employed. A high efficiency separation column was achieved without any optimization of the packing procedure, illustrating the ease with which screening experiments can be accomplished.

EXAMPLE 4

The packed column of Example 3 was used for chromatographic separation using the DX 500 system from Dionex Corporation substituting the chromatographic column of the invention for a standard column. Standard analyte solutions containing various mixtures of anions were injected. The first standard mixture includes the common anions: fluoride, chloride, carbonate, sulfate, nitrite, bromide, nitrate and phosphate. The second standard mixture contains the common monovalent anions (fluoride, chloride, nitrate, bromide and nitrate) along with the disinfectant byproduct anions (chlorite, bromate and chlorate). The third standard mixture contains the common anions (fluoride, chloride, carbonate, sulfate, nitrite, bromide, nitrate and phosphate) along with the disinfectant byproduct anions (chlorite, bromate and chlorate). The fourth standard mixture contains some of the common anions (fluoride, chloride, carbonate, sulfate) along with other anions of environmental interest (thiosulfate, iodide, thiocyanate and perchlorate).

Figure 2:
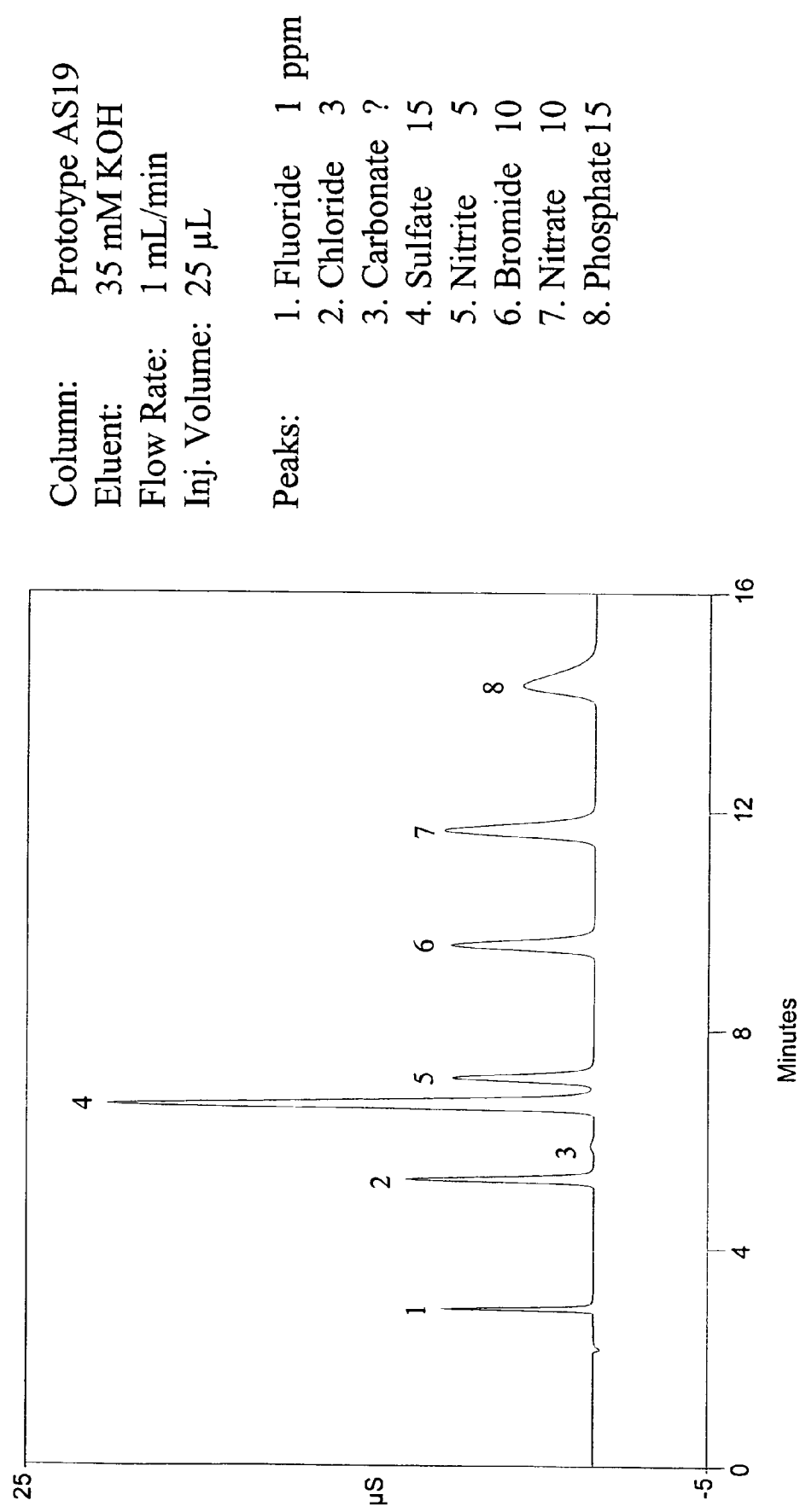
Figure 3:
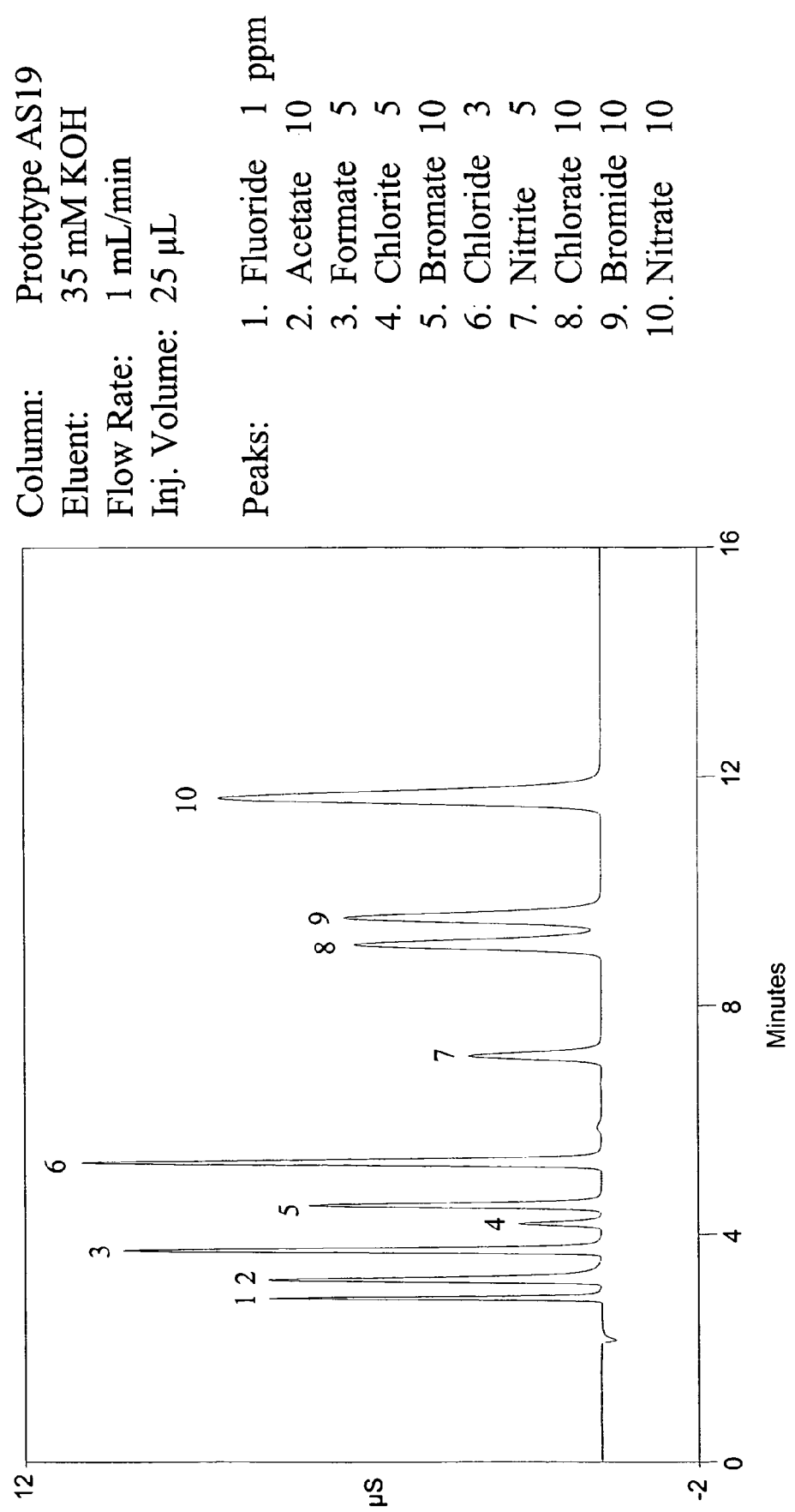
Figure 4:
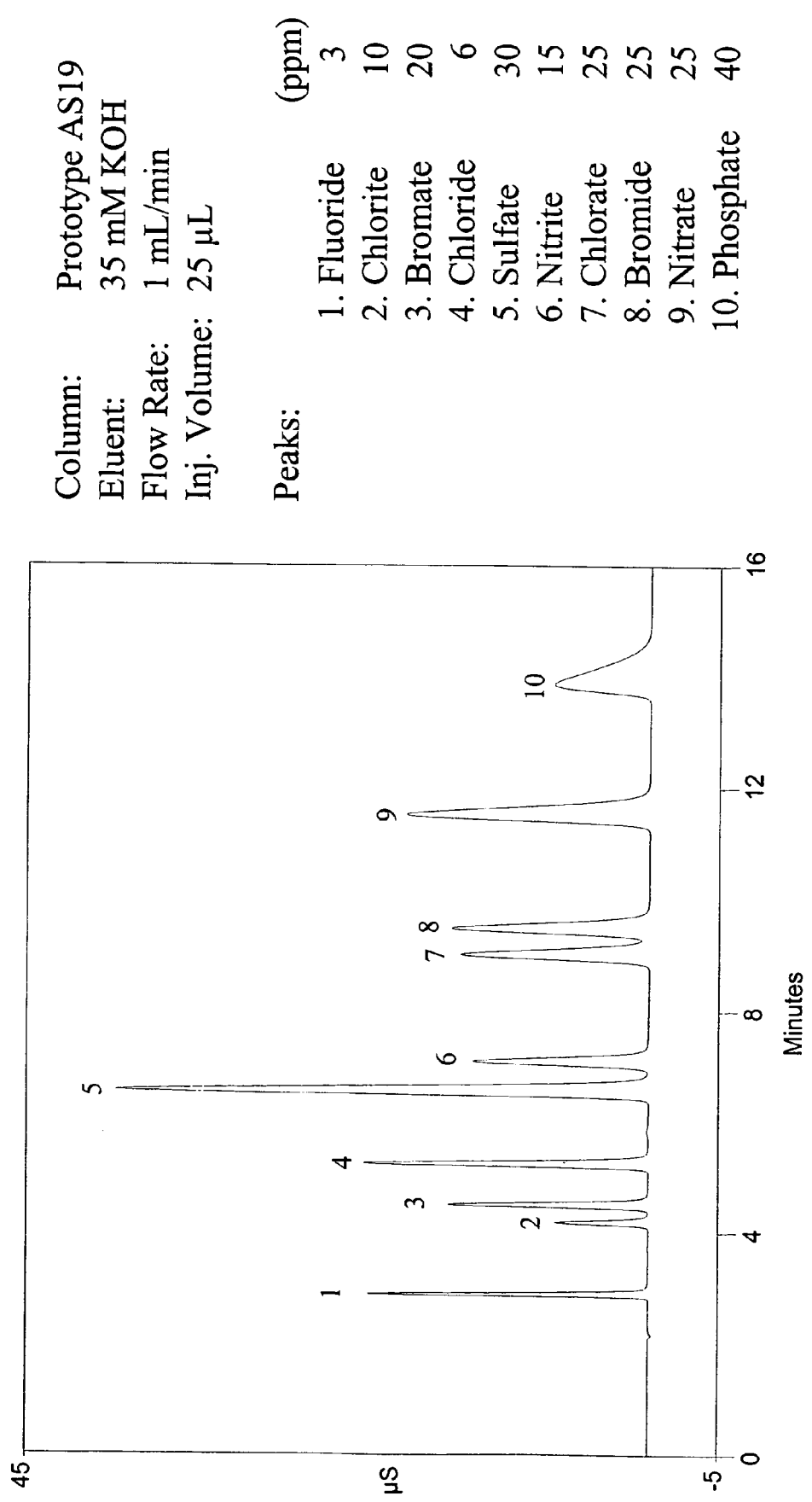
Figure 5:
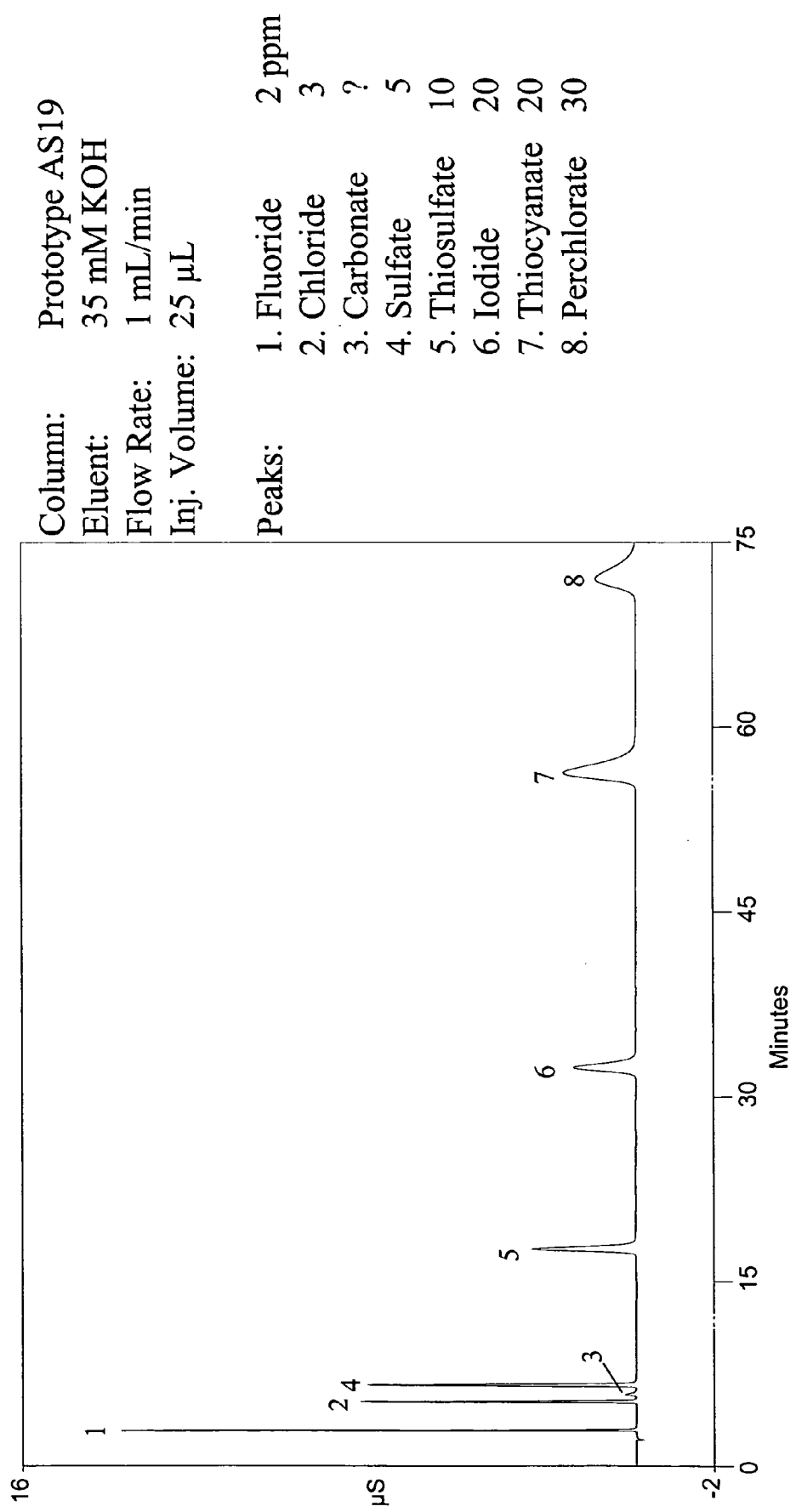

FIG. 2 illustrates the ability of the material produced in Example 3 to accomplish the separation of the common anions. Such a separation is a prerequisite for a commercially viable material for use in analytical ion chromatography. FIG. 3 illustrates the separation of disinfectant byproduct anions in the presence of common monovalent anions. Previously available hydroxide selective anion exchange phases exhibited significantly different selectivity with much poorer resolution of bromate from chloride. Also, chlorate elutes before bromide on this new stationary phase unlike all previous hydroxide selective materials where chlorate elutes in the proximity of nitrate or in some cases well after nitrate with much poorer peak shape. FIG. 4 illustrates the ability of the material produced to separate disinfectant byproduct anions in the presence of the common anions. FIG. 5 illustrates the utility of the product for the separation of polarizable anions such as thiocyanate, thiosulfate, iodide and perchlorate. The fourth chromatogram illustrates the general utility of the new material for anion separations whether they be hydrophilic or polarizable.

What is claimed is:

1. In a method for making an ion exchange coating on a substrate, the steps of:
   (a) reacting at least a first amine compound comprising amino groups selected from the group consisting of ammonia, a primary and a secondary amine, with at least a first polyfunctional compound, having at least two functional moieties reactive with said amino groups, in the presence of a substrate to form a first condensation polymer reaction product, with a first unreacted excess of either at least said first amino group or polyfunctional compound functional moieties, attached to said substrate, and
   (b) reacting at least a second amine compound, comprising amino groups selected from the group consisting of ammonia, a primary and a secondary amine, or at least a second polyfunctional compound with the unreacted excess in the first condensation polymer reaction product to form a second condensation polymer reaction product.

2. The method of claim 1 in which said substrate includes anion functional moieties on its surface and said attachment is by electrostatic bonding between said condensation polymer amino groups and said anion functional moieties.

3. The method of claim 1 in which said substrate has a surface comprising an organic polymer.

4. The method of claim 1 in which said two functional moieties of said first and second polyfunctional compounds include at least one functional moiety selected from the group consisting of epoxides, alkyl halides, benzylhalides, tosylates, methylsulfides and mixtures thereof.

5. The method of claim 1 in which said at least two functional moieties of said first and second polyfunctional compound comprise epoxide moieties.

6. The method of claim 1 wherein after step (b) said second amino group or second polyfunctional compound functional moieties are in unreacted excess in said second condensation polymer reaction product, said method further comprising
   (c) reacting at least a third amine compound, comprising amino groups selected from the group consisting of ammonia, a primary and a secondary amine, or a third polyfunctional compound with said second condensation polymer reaction product, said third amine compound or third polyfunctional compound being reactive with said unreacted excess in said second condensation polymer reaction product, to form a third condensation polymer reaction product.

7. The method of claim 6 further comprising repeating step (c) at least one more time and reacting amine reactive functional moieties on the exterior surface of said coated substrate after said repeating step with an amine containing cation functional compounds to convert the packing to a cation exchange substrate.

8. The product formed by the method of claim 6.

9. The method of claim 6 in which said third condensation polymer includes a functional group which is cross-linked.

10. The method of claim 6 in which said third condensation polymer includes a functional group which includes branched polymer chains.

11. The method of claim 1 in which steps (a) and (b) are performed in a flowthrough chamber by sequentially flowing said first and second amine compounds and first or second polyfunctional compounds past said substrate.

12. The method of claim 1 in which step (a) is performed on a plurality of said substrates in the form of particles and said coated substrates comprise ion exchange packing particles.

13. The method of claim 12 in which step (a) is performed on a plurality of said substrates in the form of particles and wherein said coated substrates comprise ion exchange packing particles, said coated particles are removed from said chamber in a form suitable for use as chromatographic packing.

14. The method of claim 1 in which said substrate comprises a flow-through monolithic medium.

15. The method of claim 1 in which said substrate comprises a wall of a flow-through hollow tube.

16. The method of claim 1 further comprising reacting a third amine compound with said first polyfunctional compound in step (a).

17. The method of claim 1 further comprising reacting a third polyfunctional compound with said first amine compound in step (a).

18. The method of claim 1 further comprising reacting a third amine compound or third polyfunctional compound with said excess first amine compound or first polyfunctional compound in step (b).

19. The product formed by the method of claim 1.

20. A coated ion exchange substrate in which said coating comprises at least a first and second condensation polymer reaction product, said first reaction product being attached to said substrate and comprising a first condensation polymer reaction product of at least a first amine compound, comprising amino groups selected from the group consisting of ammonia, a primary and a secondary amine, and at least a first polyfunctional compound with at least two functional moieties reactive with said amino groups, and said second condensation polymer reaction product comprising the reaction product of either said at least first amine compound or said at least first polyfunctional compound with at least a second amine compound or second polyfunctional compound.

21. The coated substrate of claim 20 in which said two functional moieties of said first and second polyfunctional compound include at least one functional moiety selected from the group consisting of epoxide, alkyl halides, benzylhalides, tosylates, methylsulfides, and mixtures thereof.

22. The coated substrate of claim 20 in which said substrate comprises a flow-through monolithic medium.

23. The coated substrate of claim 20 in which said substrate comprises a wall of a flow-through hollow tube.

24. The coated substrate of claim 20 in which said at least one of said two functional moieties of said first and second polyfunctional compounds comprise epoxide moieties.

25. A plurality of the coated substrates of claim 20 in the form of particles comprising ion exchange packing particles.

26. The coated substrate of claim 20 in which the outer surface of said coating includes amino functional groups bound to cation functional groups.

27. The coated substrate of claim 20 in which said substrate has a surface comprising an organic polymer.

28. The coated substrate of claim 20 in which said substrate includes anion functional moieties on its surface and said irreversible attachment is by electrostatic bonding between said first condensation polymer amine functional moieties and said anion functional moieties.

29. The coated substrate of claim 20 in which said third condensation polymer includes a functional group which is cross-linked.

30. The coated substrate of claim 20 in which said third condensation polymer includes a functional group which includes branched polymer chains.

* * * * *

UNITED STATES PATENT AND TRADEMARK OFFICE
CERTIFICATE OF CORRECTION

PATENT NO. : 7,291,395 B2  Page 1 of 1
APPLICATION NO. : 10/782366
DATED : November 6, 2007
INVENTOR(S) : Christopher A. Pohl et al.

It is certified that error appears in the above-identified patent and that said Letters Patent is hereby corrected as shown below:

IN THE TITLE

On the Title page item (54), change "EXCHANGED" to -- EXCHANGE --.

IN THE SPECIFICATION

Col. 1, in the title, change "EXCHANGED" to -- EXCHANGE --.

Signed and Sealed this

Twenty-ninth Day of April, 2008

JON W. DUDAS
*Director of the United States Patent and Trademark Office*